Figure 1:
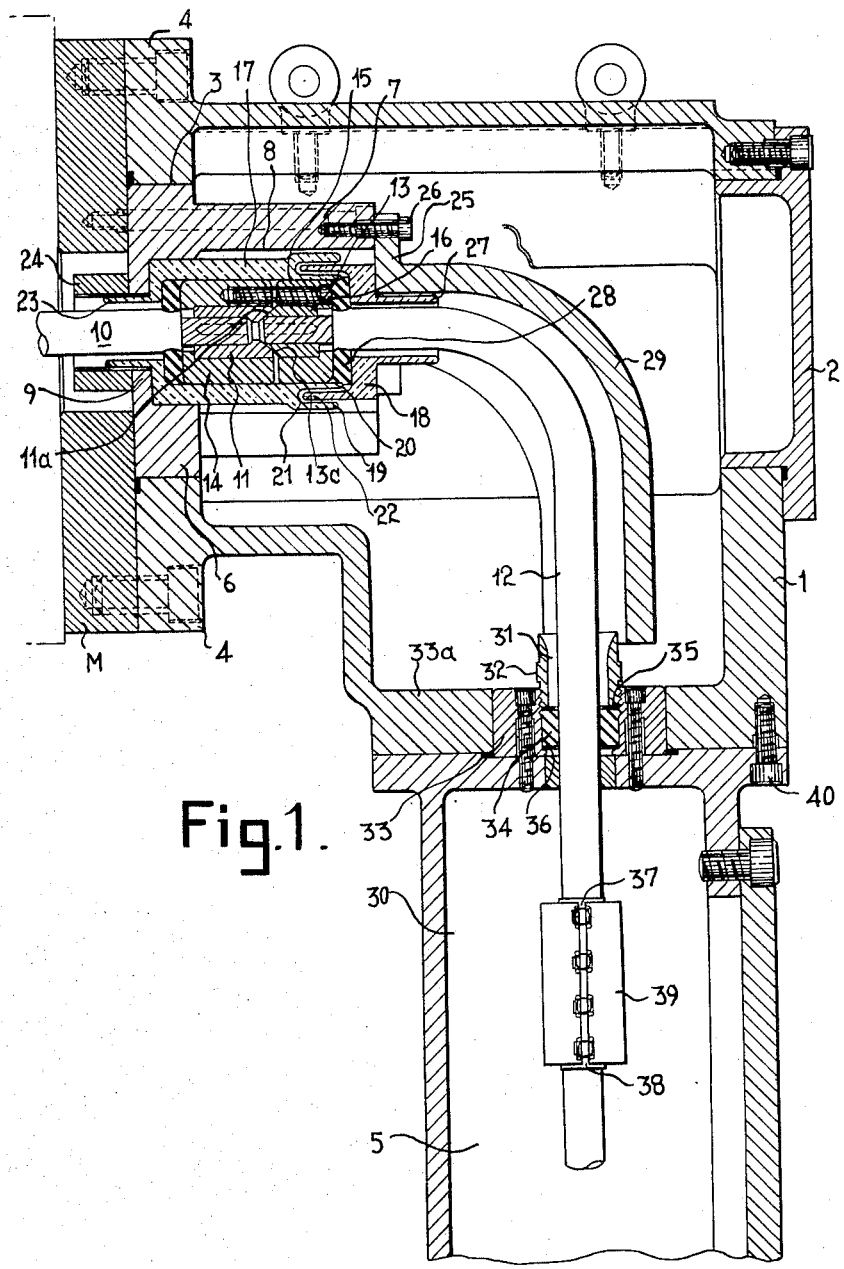

INVENTORS
FREDERICK BROOM
WALTER HILL

NORRIS & BATEMAN
ATTORNEY

United States Patent Office 3,244,794
Patented Apr. 5, 1966

3,244,794
TERMINAL BOXES FOR ELECTRICAL APPARATUS
Walter Hill, Stretford, and Frederick Broom, Walkden, England, assignors to Associated Electrical Industries Limited, London, England, a British company
Filed Dec. 23, 1963, Ser. No. 332,360
Claims priority, application Great Britain, Dec. 27, 1962, 48,664/62
8 Claims. (Cl. 174—48)

This invention relates to terminal boxes for electrical apparatus, particularly suitable for use on dynamo-electric machines which are required to be flameproof in operation under fault conditions. With such apparatus used on systems of high power potential, it is of the greatest importance to avoid danger to personnel in the vicinity which may arise due to flame originating in the terminal box and cutting through the iron or steel wall of the box and allowing hot gas and flame to emerge.

In accordance with the present invention an electric terminal connection between the ends of incoming and outgoing conductors of a terminal box adapted to be secured to electrical apparatus (e.g. a dynamo-electric machine), comprises interfitting conical contacts secured to the conductor ends, a contact enclosure of rigid insulating material defined by two tubular telescoping insulators mounted over a bushing formed in two parts embracing the respective contacts and clamped together endwise by screw means for maintaining the interfitting contacts in pressure engagement, and means for mounting the contact enclosure assembly on a wall of the terminal box with the conductors passing therethrough.

The contact enclosure assembly may be accommodated within a flanged metal housing with pressure being exerted endwise on the telescoping insulators and the ends of the screw-clamped bushing part to effect sealing of the terminal contact connection within the insulating contact enclosure.

The metal housing for accommodating the contact enclosure assembly under pressure may comprise within the terminal box an end plate to which an arc-shield is secured. This arc-shield preferably takes the form of a longitudinally slotted metal tube which nearly encloses the conductor leading to the contacts through the inner end of the insulating contact enclosure and in the event of certain faults within the terminal box the conductor will vaporise along the slotted tube towards the supply.

For use with multi-phase apparatus the terminal box may, if desired, comprise a single casing with separate interior compartments for each phase, but even if separate interior compartments are not provided phase separation will be achieved by virtue of the split tubular arc-shields and sealing compound introduced as is customary into the lower part of the terminal box casing. One example of a compartmented box, however, is described in our U.S. Letters Patent No. 3,153,695 issued October 20, 1964.

Figure 2:
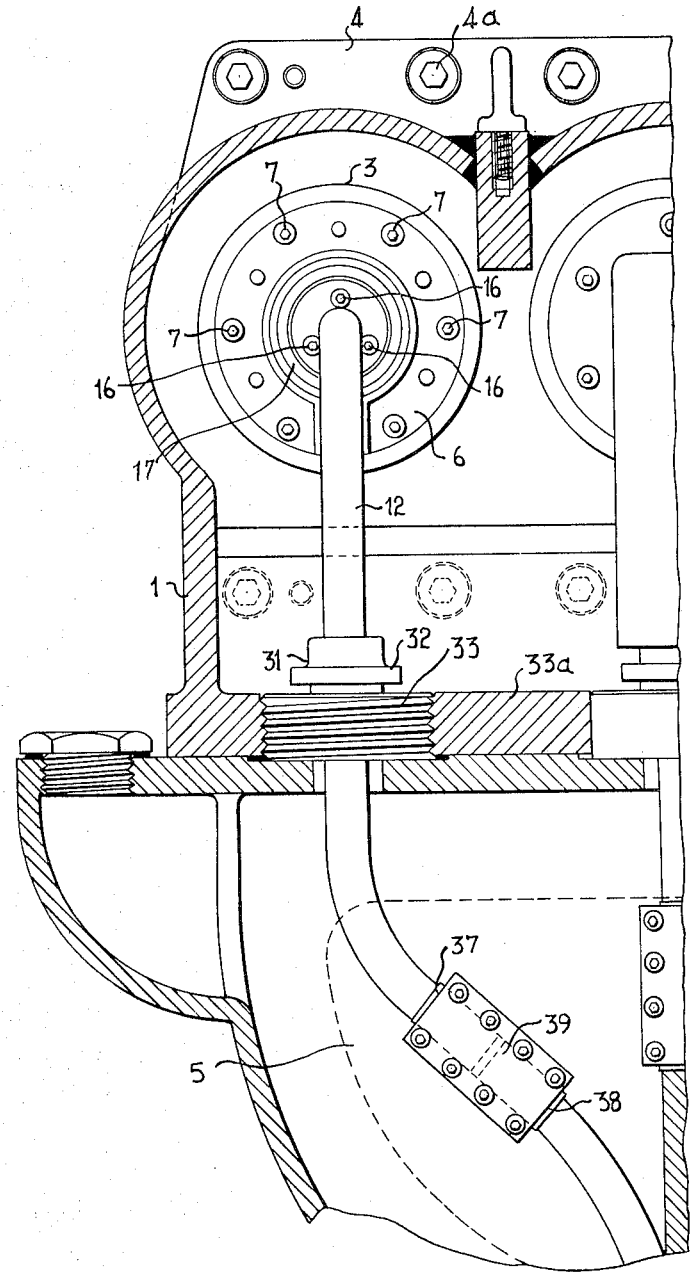

The invention will now be described by way of example with reference to the accompanying drawings, in which:

FIG. 1 is a fragmentary sectional side elevation through a terminal box containing a terminal connection according to the invention; and FIG. 2 is a fragmentary front end view of the terminal box, with the front end wall of the box and tubular arc-shield removed.

The box illustrated comprises a welded steel casing 1 with a front access opening closed by a steel cover or lid 2, and a rear opening 3. The casing may be mounted on electrical apparatus (such as a motor through a terminal plate structure M) as, for example, by a rear flange 4 and securing bolts 4a. The casing opens at the bottom into a distribution box shown partly at 5. The opening 3 receives a spigot disc 6, longitudinally slotted at 6a, which is secured to the terminal plate structure M by bolts 7 and has a central bore 8 which is partially closed at one side of the disc by a radial flange 9, thereby providing the principal part of a housing for accommodating an insulating contact enclosure of a terminal connection.

An apparatus cable 10 which may be connected to the stator winding of the motor and which terminates in a contact ferrule 11 as of copper, and a supply cable 12 terminating in a contact ferrule 13 which may also be of copper, enter the bore 8 of the spigot disc from opposite sides and are embraced by respective bushing parts or sleeves 14 and 15 as of steel which are drawn together endwise by screws 16 and which are mounted within an enclosure defined by telescoping tubular insulators 17 and 18. The insulator 17 is formed with two axially projecting cylindrical ribs 19 and 20 providing a groove 21 between them; insulator 18, however, is formed with a single axially extending rib 22 having a sliding interengagement with the ribs 19 and 20. The insulator 17 also has an axially extending rib 23 which extends through the reduced bore of the spigot disc 6 adjacent the flange 9. A nut 24 is threaded on to the projecting portion of the rib 23 as indicated.

The contact ferrule 11 has an external conical face 11a which mates with a conical face 13a on ferrule 13. As mentioned above, the bushing parts 14 and 15 are drawn together end-to-end by the screws 16 so that the cable contacts 11 and 13 are held in pressure engagement. The housing for the contact enclosure assembly is completed by a radially slotted apertured plate 25 screwed by screws 26 to the inner end of the spigot disc 6. The supply conductor 12 extends through an axially extending rib 27 on the insulator 18, which rib itself projects through the central aperture of the plate 25, and into the terminal box. Sealing rings 28 of rubber are introduced between the bushing parts 14 and 15 and the telescoping insulators 17 and 18. The whole insulating assembly within the housing defined by the spigot disc 6 and the plate 25 is under compression so that sealing of the terminal connection within the box is effected within the insulating contact enclosure by compression of rubber rings 28.

In order to ensure that fault arcs within the terminal box are short whatever the type of fault and thereby preventing flashover between phases, a steel cover is fitted around the supply cable 12 extending from the box 5 to contact ferrule 13. In the illustrated embodiment, this cover is provided by a longitudinally slotted tube 29 which is welded to the plate 25 defining the right-hand end of the contact enclosure housing. This tubular arc-shield ensures that the arc length in the case of faults is kept to the desired minimum while preventing flashover between phases and thereby affording phase separation in multi-phase boxes. The distribution box will contain sealing compound 30 through which the incoming conductor from the supply passes. The box 5 will be filled with this compound and the supply conductor or cable 12 passes into the upper compartment of the box through a sealing gland 31. This sealing gland comprises a nut 32 which screws into a tapped hole in an insert 33 in the upper transverse wall 33a of the terminal box and compresses a rubber sealing bush 34 between washers 35 and 36 fitted into the tapped hole. The rubber bush which embraces the cable 12 effects sealing of the cable 12 through the gland 31.

As will be apparent from FIG. 1, the box 5 together with the gland assembly 31 can be removed by unbolting at 40. Also, the supply cable 12 in the present embodiment is split within the box 5, the two ends of the cable having ferrules 37 and 38, such as of copper, secured to them and the ferrules being connected together by means of a clamp connector 39.

It will be seen that the construction described herein provides a terminal connection, in which contact between the incoming and outgoing cables or conductors is maintained by conical contacts under a constant clamping pressure exerted by the screws 16 on the bushing parts 14 and 15 and these bushing parts and contacts are further compressed by the compression of the contact enclosure assembly as a whole within the housing. Instead of the contacts themselves being bolted together and subsequently insulated, for example by taping, as has hitherto been the usual practice, the current-carrying parts are surrounded by an insulating bushing. An important advantage of this arrangement is that under fault conditions no fault arc is likely to be greater than the thickness of the insulation employed. This will lead to low arc voltages, low energy input and low pressure rise which needs no means for pressure relief and all its complications. The cables are relatively easy to connect and disconnect as the terminal enclosure is held together simply by the screws 24 and the contacts by screws 16.

It is understood that the invention is not limited to the particular construction illustrated and described in the foregoing, but that modifications may be made without departing from the scope of the invention set forth. For example, the arc-shield 29 need not be welded to plate 25, but could be mounted and fixed independently in the required position. In the event of a fault, the cable 12 will vaporise along the tubular arc-shield 29 in the direction of the supply.

What we claim is:

1. A flameproof electric terminal box adapted to be secured to electric apparatus such as a dynamo-electric machine, comprising a completely enclosed electric terminal connection situated inside the terminal box between the ends of incoming and outgoing conductors of said box, said connection comprising axially interfitting contacts secured to the conductor ends, surrounding said contacts rigid clamping means comprising bushing means formed in two parts embracing the respective contacts and clamped together by axially directed screw means for maintaining the interfitting contacts in pressure engagement, said bushing means having around it an enclosure of rigid insulating material defined by tubular telescoping insulators, sealing means for said telescoping insulators and means for mounting the contact enclosure assembly on a wall of the terminal box with the conductors passing therethrough and with said sealing means under compression.

2. A flameproof electric terminal box as claimed in claim 1, in which said mounting means comprises a flanged metal housing within which the enclosed contact assembly is accommodated and securing means for mounting the contact assembly on the terminal box wall, said securing means including an end plate exerting endwise pressure on the telescoping insulators enclosing said bushing parts and to compress said sealing means axially within the assembly to effect sealing of the terminal contact connection within the insulating contact enclosure.

3. A flameproof electric terminal box as claimed in claim 1, in which the flanged metal housing for accommodating the contact enclosure assembly comprises within the terminal box an end plate to which an arc-shield is secured.

4. A flameproof electric terminal box as claimed in claim 3, in which the arc-shield comprises a longitudinally slotted metal tube which nearly encloses the conductor leading to the contacts through the inner end of the insulating contact enclosure.

5. A flameproof electric terminal box for use with multi-phase apparatus as claimed in claim 1, comprising separate interior compartments for the respective phases of the multi-phase apparatus, with each compartment having its own insulating contact enclosure assembly.

6. A flameproof electric terminal box adapted to be secured to electric apparatus such as a dynamo-electric machine, comprising a sealed electric terminal connection situated inside the terminal box between the ends of incoming and outgoing conductors of said box, said connection comprising axially interfitting contacts of conical form secured to the conductor ends, surrounding said contacts rigid clamping means comprising a split bushing embracing the respective contacts and clamped together by axially directed screw means for applying axial compression to the interfitting contacts without completely closing the split in the bushing, said bushing having an enclosure of rigid insulating material defined by two tubular telescoping insulators, sealing means for said telescoping insulators at the opposite ends thereof and means for mounting the contact enclosure assembly on a wall of the terminal box with the conductors passing therethrough and said sealing means under compression.

7. A flameproof electric terminal box adapted to be secured to electric apparatus such as a dynamo-electric machine, comprising a sealed electric terminal connection situated inside the terminal box between the ends of incoming and outgoing conductors of said box, said connection comprising axially interfitting contacts secured over the conductor ends, surrounding said contacts rigid clamping means comprising a bushing split in two parts in a plane transverse to the axis, said bushing parts embracing the respective contacts, axially directed clamping screw means for said bushing parts maintaining the interfitting contacts in pressure engagement without closing the split, said bushing having an enclosure of rigid insulating material defined by two tubular telescoping insulators, compressible sealing means for said telescoping insulators at opposite ends thereof and means for mounting the contact enclosure assembly on a wall of the terminal box with the conductors passing therethrough and said sealing means under compression.

8. In a flameproof electric terminal box, telescoped tubular insulators defining an enclosed space into which extend the ends of incoming and outgoing conductors, axially interfitting contacts on the conductor ends within said space, clamp means within said space for securing said contacts together in pressure engagement, compressible seal means disposed between said clamp means and said insulator members, and means within the box for mounting said insulators comprising members engaging the respective insulators and means for drawing said members toward each other whereby said sealing means is compressed between the clamp means and insulators within said space.

References Cited by the Examiner

UNITED STATES PATENTS 1,840,072  1/1932  Williams _____ 174—75
3,153,695  11/1964  Hill et al. _____ 174—52

ROBERT K. SCHAEFER, *Primary Examiner.*

JOHN F. BURNS, *Examiner.*

W. B. FREDRICKS, *Assistant Examiner.*